United States Patent [19]

Takagi

[11] Patent Number: 4,459,909
[45] Date of Patent: Jul. 17, 1984

[54] MOLD SUPPORTING ARRANGEMENT IN A PRESS

[76] Inventor: Shozo Takagi, 950, Nakayama-cho Nishi 2-chome, Nara, Japan

[21] Appl. No.: 364,676

[22] Filed: Apr. 2, 1982

[51] Int. Cl.$^3$ ............................................. B30B 15/06
[52] U.S. Cl. ..................................... 100/295; 29/465; 72/448; 164/343
[58] Field of Search .................... 29/465; 72/448, 446; 164/137, 343; 100/295, 918, 229 R; 308/6 R, 173

[56] References Cited

U.S. PATENT DOCUMENTS

| | | | |
|---|---|---|---|
| 2,490,879 | 12/1949 | Milich | 308/6 R UX |
| 2,944,684 | 7/1960 | Dennis | 100/295 UX |
| 3,139,676 | 7/1964 | Grouer | 100/918 X |
| 3,456,481 | 7/1969 | Zeitlin | 100/918 X |
| 4,060,252 | 11/1977 | Mowery | 308/6 R X |
| 4,152,978 | 5/1979 | Abe | 72/446 X |
| 4,285,550 | 8/1981 | Blackburn | 308/6 R |
| 4,301,673 | 11/1981 | Yonezawa | 72/448 |

FOREIGN PATENT DOCUMENTS

| | | | |
|---|---|---|---|
| 824621 | 12/1951 | Fed. Rep. of Germany | 308/6 R |
| 1201248 | 9/1965 | Fed. Rep. of Germany | 308/6 R |

Primary Examiner—Charlie T. Moon
Attorney, Agent, or Firm—Birch, Stewart, Kolasch & Birch

[57] ABSTRACT

A method and arrangement for setting metal molds on a press bolster are disclosed. A plurality of spaced bearing units are arranged in a press bolster wherein freely rotatable main large balls of the bearing units protrude at their tops slightly above a level of an upper surface of the bolster so as to cooperate to freely slidably support a combined set of an upper and a lower molds placed thereon, for positional adjustment of the molds to a desired exact position on the bolster.

1 Claim, 22 Drawing Figures

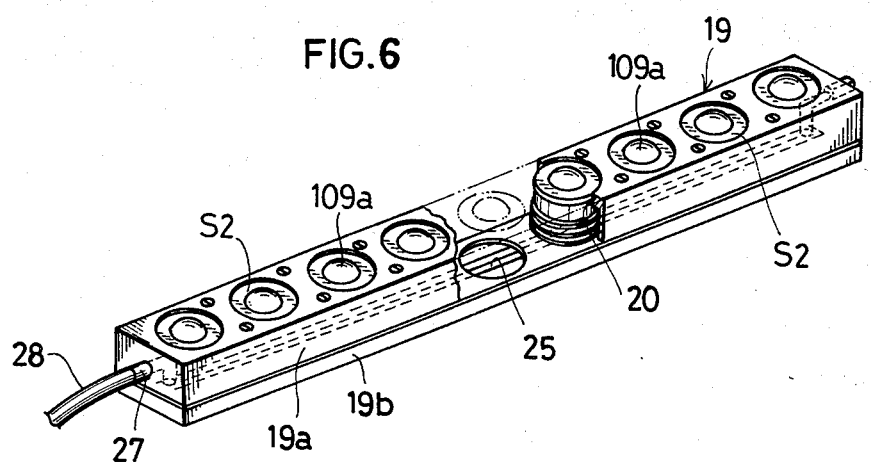
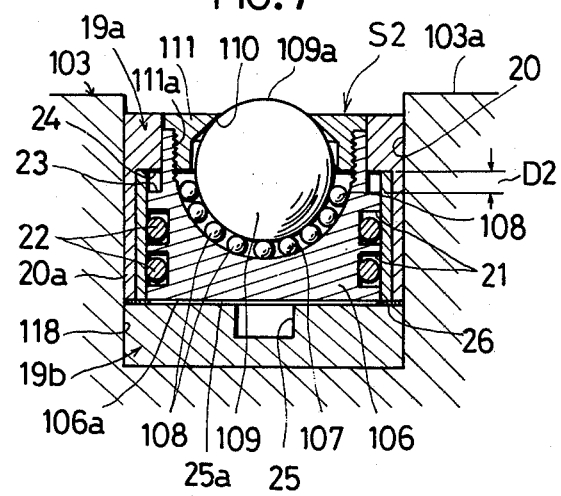
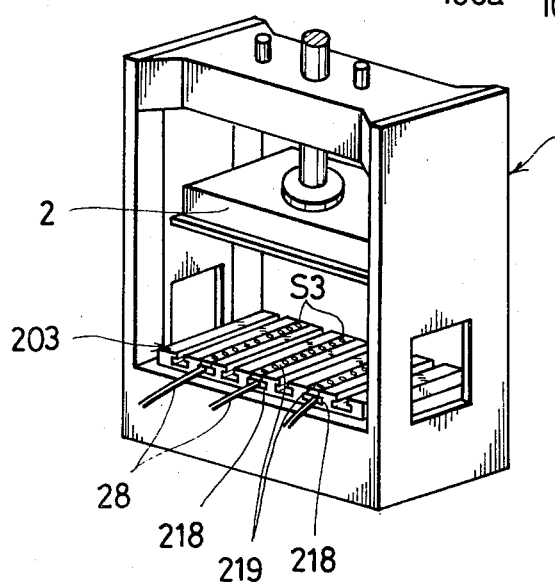

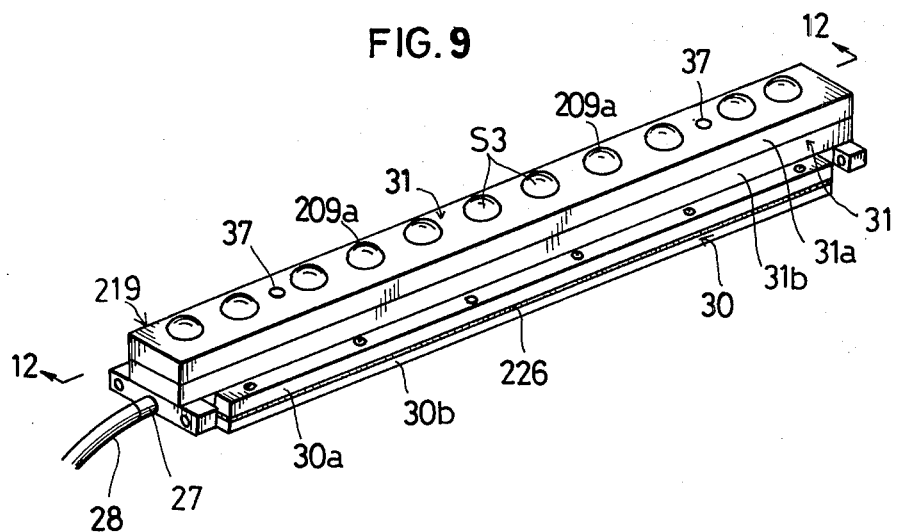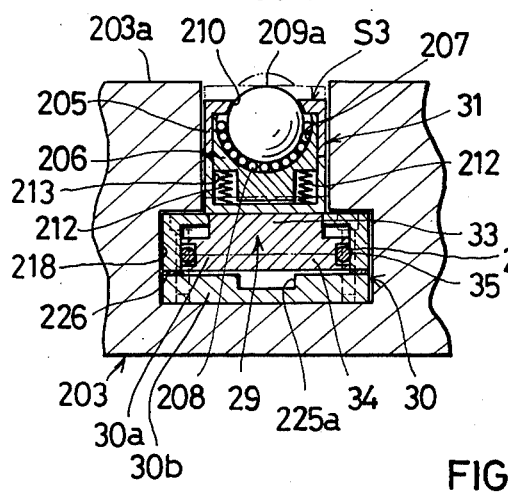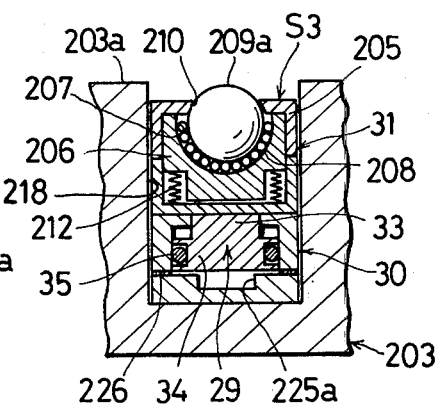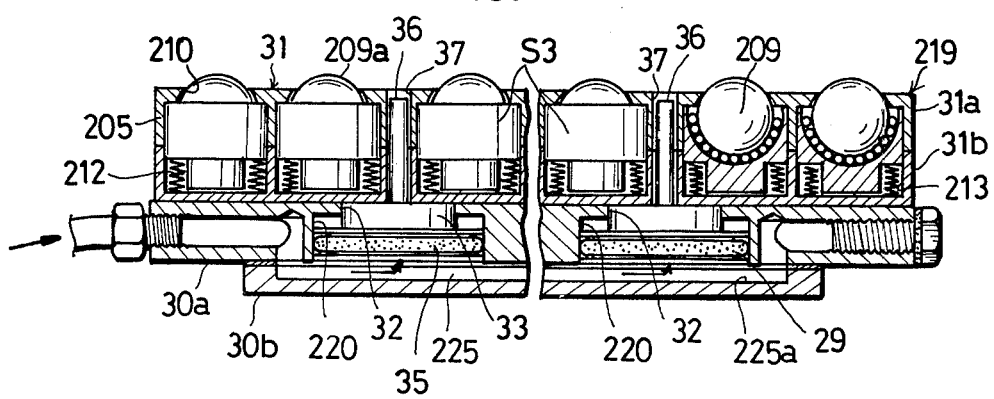

MOLD SUPPORTING ARRANGEMENT IN A PRESS

BACKGROUND AND SUMMARY OF THE INVENTION

The present invention relates to a method for setting metal molds to a press and also to a mold supporting arrangement for use in carrying out the method.

A typical type of press generally includes a stationary bolster mounted on a machine bed, a lower metal mold or die supported by the bolster, a movable press ram which is guided for vertical movement in the machine frame, and an upper metal mold or punch supported by the press ram, being so constructed that a workpiece placed between the upper and the lower molds is mechanically pressed for a desired processing as the press ram is actuated by means of a suitable power drive arrangement such as a hydraulically or electrically controlled drive.

As is well known, the upper and the lower molds must be replaced in accordance with variation in configuration and/or dimension of a workpiece, and such replacement of the molds requires time and labor because the molds must be located on the bolster and the ram, with very strict accuracy in order to obtain high precision products.

However, heretonow there has not been proposed an effective method for setting the molds very precisely with less time and labor. Conventionally, therefore, a minute positional adjustment in the mold setting has been conducted by repeating manual trial pressings. In particular, in case where the molds are very heavy in weight, the positional adjustment of the molds is extremely time and labor consuming.

It is, therefore, an object of the invention to provide a novel method for setting metal molds to a press, which eliminates the above-discussed disadvantages in the conventional methods.

Another object of the invention is to provide an efficient method for setting metal molds to a press, which permits an easy and quick positional adjustment of the molds on a bolster.

A further object of the invention is to provide a novel mold supporting arrangement for use in carrying out the above method.

A still further object of the invention is to provide an efficient mold supporting arrangement which permits free sliding of metal molds on a bolster.

Other objects, features and advantages of the invention will become more fully apparent from the datailed description given hereinafter in connection with the accompanying drawings. It should be understood, however, that the detailed description and specific examples, which indicate preferred embodiments of the invention, are given by way of illustration only, since various changes and modifications within spirit and scope of the invention will be apparent to those skilled in the art from this detailed description.

The method according to the present invention comprises arranging a plurality of bearing units in a press bolster so that freely rotatable main large balls thereof can protrude slightly above the level of an upper surface of the bolster; placing a combined set of the upper and the lower metal molds on the slightly protruding top parts of the main balls for free sliding movement on the bolster; adjusting the combined set of the molds to a desired exact position on the bolster by sliding same minutely on the protruding top parts of the main balls; affixing the upper mold to the press ram on the minutely adjusted position; and clamping the lower mold to the bolster on the same minutely adjusted position.

According to the present invention, the upper and the lower molds are placed and positionally adjusted on the bolster in the combined condition, with the result that adjustment of the relative lateral positions between the both molds is no longer required. Since the combined set of the upper and the lower molds can freely slide on the tops of the main balls embedded in the bolster in every direction with extremely small frictional resistance, the combined set of the molds can be easily adjusted to a desired position under the press ram. After the upper mold has been affixed to the press ram in an accurate position, the lower mold can be fixed to the bolster on the spot by making the tops of the main balls forcibly retracted underneath the upper surface of the bolster so that the bottom surface of the lower mold can make tight contact with the upper surface of the bolster, and then, by clamping the lower mold in the position by means of suitable clamping devices.

Further, according to the present invention, there is provided a mold supporting arrangement which includes a plurality of bearing units directly or indirectly embedded in the press bolster, each of which comprises a layer of small steel balls disposed in a hemispherical concave seat of a seat body, a main large ball freely rotatably supported on the layer of small balls, and a mechanical or a hydraulic means for urging the main balls upward so that the top parts thereof can protrude slightly above the level of the upper surface of the bolster. The bearing units may be embedded directly in the bolster, or otherwise may be embedded in an elongated block which can be detachably mounted in a mounting slot formed in the bolster.

BRIEF DESCRIPTION OF THE DRAWINGS

FIG. 6 is an enlarged perspective view, with part broken away, of a supporting block with bearing units utilized in the second embodiment;

FIG. 7 is an enlarged cross section of the block of FIG. 6 embedded in a bolster;

FIG. 8 is also a similar view to FIG. 1, but showing a press with a mold supporting arrangement as the third embodiment;

FIG. 9 is an enlarged perspective view of a supporting block with bearing units as the third embodiment;

FIG. 10 is an enlarged cross section of the block of FIG. 9 embedded in a bolster;

FIG. 11 is a similar view to FIG. 10, but showing a modification of the block of FIG. 10;

FIG. 12 is an enlarged section taken along the line 12—12 of FIG. 9;

DESCRIPTION OF THE PREFERRED EMBODIMENTS

Figure 1:
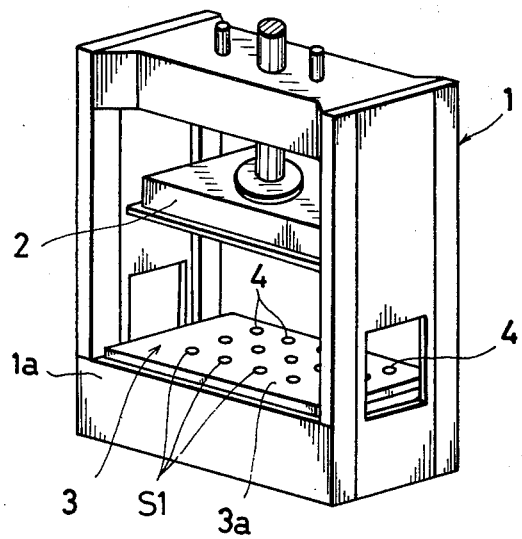
FIG. 1 is a schematic perspective view showing a press with a mold supporting arrangement as the first embodiment according to the invention.

Referring now to the drawings, initially to FIGS. 1 to 4 illustrating the first embodiment of a mold supporting arrangement according to the present invention, a press is illustrated as having a machine frame 1, a press ram 2 conventionally mounted to the machine frame for up-and-down movement through power from a suitable power drive such as a hydraulic cylinder (not shown) or an eccentric crank (not shown) or the like known power drive, and a stationary bolster 3 mounted on a base 1a of the machine frame 1. An upper mold or punch (not shown) is affixed to the ram 2 conventionally, while a lower mold or die (not shown) is affixed to the bolster 3 in the manner as will be hereinafter described.

Figure 4:
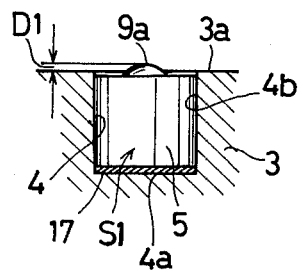
FIG. 4 is an elevational view showing the bearing unit embedded in a bolster.

The bolster 3 has a plurality of spaced, cylindrical seating holes 4 formed therein, each of which has a bottom wall 4a and a cylindrical internal wall 4b extending vertically from the bottom wall 4a to the upper surface 3a of the bolster, as shown in FIG. 4. A plurality of bearing units S1 are seated in all or selected number of the holes 4. The number of the bearing units S1 should be determined in accordance with weight of the lower mold to be supported thereby.

Figure 2:
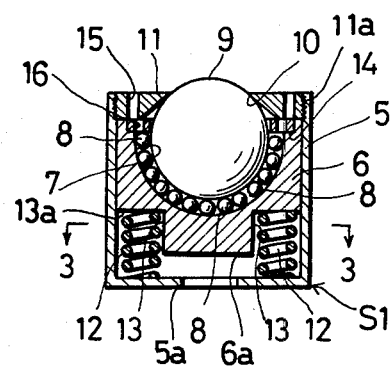
FIG. 2 is an enlarged section of a bearing unit utilized in the first embodiment.
Figure 3:
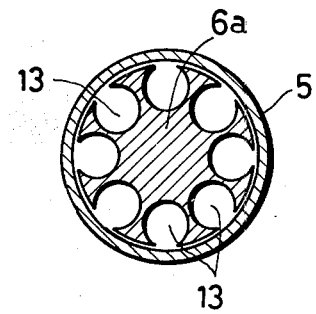
FIG. 3 is a cross section taken along the line 3—3 of FIG. 2, in which a plurality of springs are not shown.

Each of the bearing units S1 is illustrated in FIGS. 2 to 4 as having a cylindrical casing 5 substantially corresponding in dimension to the hole 4.

In the casing 5 is disposed a seat body 6 so as to be slidable up and down within a certain limited range. The seat body 6 has a hemispherical concave seat 7 formed in the upper side thereof. A layer consisting of a number of small steel balls 8 is disposed on the hemispherical concave surface wall of the seat 7, and on the layer 8 is seated a large main ball 9 for free rotation in every direction. In assembly, after the large ball 9 has been seated on the layer of small balls 8, an annular lid 14 is screwed into the top wall of the seat body 6 so that the balls 8 and 9 are movably retained in position. The annular lid 14 may preferably be formed with a pair of spaced small bores 16 which engage a pair of corresponding spaced, small projections of a known hand tool (not shown) for screwing or unscrewing the lid 14.

The casing 5 is covered with an annular cover plate 11 which has an opening window 10 formed in the center thereof, so that a top part of the main ball 9 can protrude through the windows 10. The cover plate 11 is fixed to the casing 5 by screwing the same into an opening top of the casing 5 by threads 11a as shown in FIG. 2. The cover plate 11 is adapted to serve as a stop for restricting an upward movement of the seat body 6 as will be described in detail hereinafter.

The seat body 6 has a plurality of vertically extending, cylindrical chambers 13 formed in the bottom wall 6a thereof. All or a selected number of the chambers 13 are filled with compression coil springs 12, each of which is interposed between a bottom wall 5a (FIG. 2) of the casing 5 and an inner wall 13a of each chamber 13, so that the seat body 6 is elastically supported by the compression springs 12 so as to be movable up and down within a limited range as defined by a distance between the bottom wall 6a of the seat body 6 and the bottom wall 5a of the casing 5.

The number of the coil springs 12 to be employed may be selected in accordance with weight of a pair of molds to be placed on the bolster 3. In other words, by increasing or decreasing the number of the springs 12, a supporting force effective on the top part 9a (FIG. 4) of the main ball 9 can be adjusted so as to properly urge the lower mold upward against a certain given load. Preferably, a pair of spaced bores 15, which are similar to the pair of bores 16 as described above, may be formed in the cover plate 11 for the same purpose as of the bores 16.

In operation, as the main ball 9 is rotated, the small bearing balls 8 are also rotated and roll on the seat surface 7, resulting in that the main ball 9 is substantially free from frictional resistance during rotation in every direction. Further, the main ball 9 can bear a considerably heavy weight because all of the surface area of the lower half of the main ball 9 is supported by a number of small bearing balls 8.

All or the selected number of the seating holes 4 in the bolster 3 are filled with the bearing units S1, in such a manner that a top part 9a of each main ball 9 is, when under unloaded condition, urged upward by the forces of the coil springs 12 so as to protrude above the level of the upper surface of the bolster 3 through the opening window 10 by a certain predetermined distance (D1), as shown in FIG. 4. For this purpose, minute adjustment for the desired distance (D1) may be made by interposing a spacer plate 17 with a selected thickness between the walls 4a and 5a.

Figure 5:
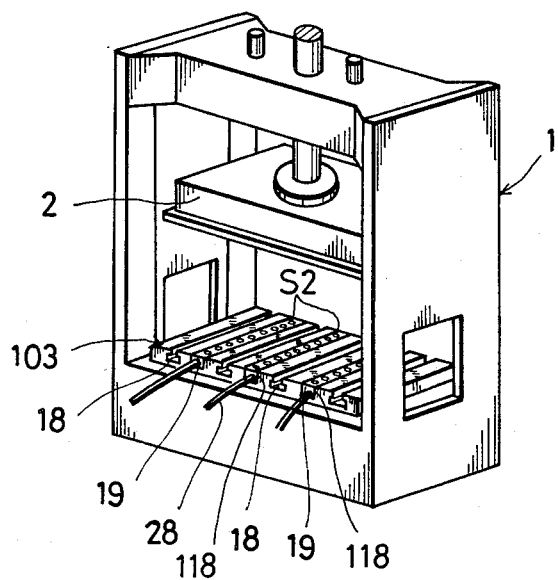
FIG. 5 is a similar view to FIG. 1, but showing a press with a mold supporting arrangement as the second embodiment.
Figure 19:
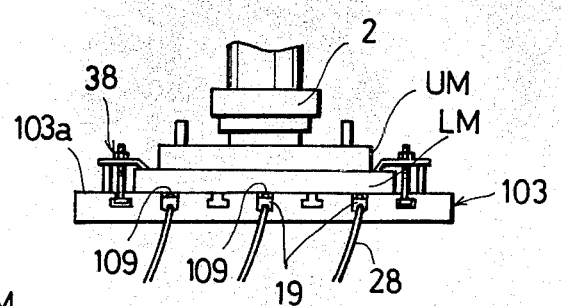

FIGS. 5 to 7 illustrate the second embodiment of the mold supporting arrangement according to the present invention, in which there are provided a bolster 103 which is formed with a plurality of T-slots 18 for engagement with a known clamping device 38 (FIG. 19) and a plurality of mounting slots 118 which are substantially square in cross section and extending in parallel to one another, and also a plurality of elongated blocks 19 each having such a dimension and a configuration as can be detachably mounted within any one of the slots 118. Each of the blocks 19 has a plurality of stepped cylindrical chambers or seating holes 20 formed therein so as to serve as cylinders. In each of the holes or cylinders 20 is seated a bearing unit S2 serving as a piston slidable up and down within a certain limited range by means of known pressure fluid.

Each of the blocks 19 may preferably be of two-piece construction having an upper member 19a superposed on a lower member 19b, for the convenience of manufacture and maintenance. The cylinder holes 20 are formed in the upper member 19a, preferably being aligned in line in spaced relation, as shown in FIG. 6. Each of the cylinders 20 has an annular shoulder 24 formed internally thereof and a cylindrical sleeve section 20a adjacent the shoulder 24, which cooperate to define the hole or chamber 20 into a stepped cylindrical configuration. The lower member 19b is formed with a longitudinal groove 25 serving as a passage for charging and discharging the known pressure fluid and also as a pressure chamber which will apply pressure to the bottom wall 106a of a seat body 106 to be hereinafter described.

Each of the bearing units S2 includes a seat body 106 which is of a stepped cylindrical configuration defined by an annular shoulder 23 which cooperates with the aforesaid shoulder 24 of the block 19 so as to restrict the upward movement of the block 19.

The seat body 106 has a hemispherical concave seat 107 formed in the upper side thereof, in which a layer of a number of small steel balls 108 is disposed, and on the layer 108, in turn, is seated a large main steel ball 109 for free rotation in every direction. In order to retain the small and the large balls 108 and 109 in position, an annular cover plate 111 with an opening window 110 is screwed at 111a into the top portion of the seat body 106, so that a part 109a of the main ball 109 can protrude from the window 110 above the level of the upper surface of the cover plate.

Preferably, one or more annular grooves 21 may be formed in the periphery of the seat body 106, so that one or more known O-rings 22 can be mounted therein, conventionally, for preventing undesirable leakage of the pressure fluid. Further, an annular oil seal 26 may preferably be interposed between the upper and the lower members 19a, 19b and also between the lower member 19b and a part of the bottom wall 106a of the seat body 106 so as to provide a narrow pressure chamber 25a intercommunicated with the fluid passage 25, with the result that an effective surface area of the bottom wall 106a to which the fluid pressure is applied can be advantageously increased. The fluid passages 25 and 25a are connected to an external pressure source (not shown) via a port 27 and a conduit 28, conventionally.

Each of the bearing units S2 should be arranged within the block 19 so that a top part 109a of each main ball 109 can protrude above the level of the upper surface 103a of the bolster 103 substantially in the same manner as shown in FIG. 4, when the pressure fluid charged in the pressure chambers 25, 25a urges each seat body 106 to move upward by the distance (D2) as shown in FIG. 7.

FIGS. 8 to 12 illustrate the third embodiment of the mold supporting arrangement according to the present invention, in which there are provided a bolster 203 having a plurality of T-slots 218 formed therein and also a plurality of elongated blocks 219. The slots 218 and the mounting blocks 219 are of the substantially same configuration in cross section, so that the latter can be detachably mounted in the former.

Each of the blocks 219 includes a stationary base member 30 and a movable upper member 31 having a series of aligned bearing units S3 mounted therein. The movable upper member 31 is superposed upon the stationary base member 30 which may be larger in width than the upper member 31 as best shown in FIG. 10. However, in case where the slots 218 are not T-shaped but square in cross section as shown in FIG. 11, the upper member 31 and the base member 30 should be the same in width as clearly shown in FIG. 11.

The upper member 31 may preferably be of two-piece construction having an elongated upper cover element 31a superposed on a lower element 31b for the convenience of manufacture and maintenance.

The base member 30 is internally formed with a plurality of cylinder chambers 220 each cooperating with a piston 29 for up-and-down movement of the upper member 31. The cylinder chambers 220 may preferably be aligned in line and spaced with a certain interval. Each of the chambers 220 is communicated at its bottom with a fluid passage 225 for the known pressure fluid, as shown in FIG. 12. The base member 30 may also preferably be of twopiece construction having an upper base 30a superposed on a lower base 30b, for the convenience of manufacture and maintenance. The upper base 30a is formed with the cylinder chambers 220 while the lower base 30b is formed with a longitudinal groove 225a which is communicated with each of the cylinder chambers 220 and serves as a part of the fluid passage 225. A known seal 226 may preferably be interposed between the upper and the lower bases 30a,30b.

The chambers 220 and the pistons 29 may be of substantially oval shape in cross section for the purpose of increasing effective surface area to which the fluid is applied.

Each of the chambers 220 has at its top a reduced opening 32 (FIG. 12) within which a piston rod 33, which is formed integral with the piston 29, is slidable up and down. Each of the pistons 29 has an annular groove 29a formed in its periphery for receiving a known O-ring 35 therein for the known sealing purpose.

The entire vertical length of the piston 29 and the rod 33 may preferably be so determined that the top surface of the piston rod 33 is flush with the bottom surface of the upper member 31 or the top surface of the lower member 30 when the piston 29 is at its lowermost stroke position, while, on the other hand, the piston rod 33 can protrude upward through the opening 32 to forcibly push up the upper member 31 as the piston 29 is in its upward stroke.

In order to realize smooth up-and-down movement of the upper member 31, a suitable guide means may preferably be provided For example, at least one pair of guide holes 37 may be formed in the upper member, while the same number of the pistons 29 are respectively formed with a guide bar 36 which extends vertically from the top of the piston rod 33 into the cooperating guide hole 37.

The upper member 31 has a plurality of longitudinally aligned compartments 205 each having an opening 210 at its top. Within each of the compartments 205 is disposed a bearing unit S3 which includes a seat body 206, a layer consisting of a number of small steel balls 208, a large main ball 209, and a plurality of compression coil springs 212. The seat body 206 is so arranged as to be slightly slidable up and down within the compartment 205 by a certain limited range defined by a clearance between the bottom wall of the seat body 206 and the bottom wall 205a of the compartment 205. The layer of the steel balls 208 is disposed in a hemispherical concave seat 207 formed in the upper side of the seat body 206. The main large ball 209 is seated on the layer 208 so as to be freely rotatable in every direction. The coil springs 212 are disposed within a plurality of cylindrical chambers 213 formed in the bottom wall of the seat body 206, so that the seat body 206 is always urged upward, with the result that the main ball 209 protrudes at its top part 209a through the opening 210 when it is under unloaded condition. The total spring force of the springs 212 should be so predetermined that the top part 209a of the main ball 209 is slightly movable downward with relative to the top surface of the cover element 31a when it is under loaded condition. As a result of this construction for safety, the applied load on the main balls 209 can be equalized, so that an undersirable stress concen tration to merely one or a small number of the main balls 209 can be prevented which occurrs when a lower mold has, for example, an irregular bottom surface.

The fluid passage 225 formed in the base member 30 is connected to a known external pressure source (not shown) via a port 27 and a conduit 28, conventionally, as shown in FIG. 9. Thus, when the passage 225 is charged with the pressure fluid to force the piston 29 to move upward, the upper member 31 is lifted up until the top surface thereof is substantially flush with the upper surface 203a of the bolster 203, with the unloaded top part 209a of each main ball 209 protruding above the level of the upper surface 203 as shown in phantom lines in FIG. 10. As a matter of course, when the piston 29 is in its lowermost position, the top part 209a of each main ball 209 is below the level of the upper surface 203a of the bolster.

FIGS. 13 to 19 illustrate how the mold setting method according to the present invention is carried out.

Figure 13:
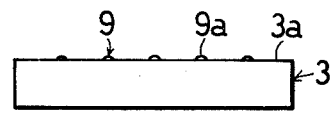
FIGS. 13 to 16 are schematic illustrations showing a series of processes for carrying out a mold setting method of the first embodiment.
Figure 14:
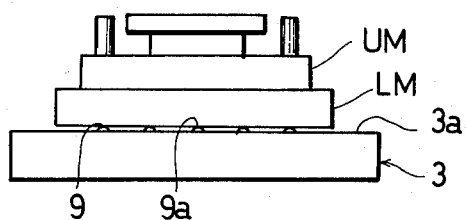
Figure 15:
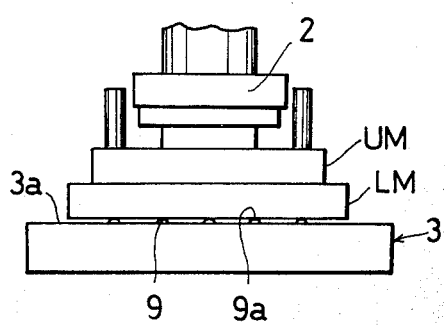
Figure 16:
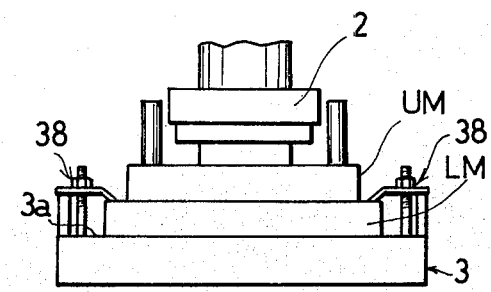

Referring now to FIGS. 13 to 16 which illustrate how to carry out the method by using the mold supporting arrangement as the first embodiment, a combined set of an upper metal mold UM and a lower metal mold LM is placed upon the bolster 3 wherein a top part 9a of each of the main balls 9 are protruded above the level of the upper surface 3a of the bolster 3, as shown in FIG. 13. Then, the molds UM and LM are positionally adjusted by sliding them on the bolster 3, so that the upper mold UM is just positioned below the ram 2, as shown in FIGS. 14 and 15. As will be easily understood from the foregoing description, this can be performed quite easily. After lowering the ram 2 onto the upper mold UM and affixing the same to the ram 2 accurately, the lower mold LM is fixed on the spot by clamping the same by means of known clamps 38, so that the top part 9a of each main ball 9 is forcibly retracted below the upper surface 3a of the bolster 3, resulting in that the bottom surface of the lower mold LM is in contact with the surface 3a of the bolster 3, as shown in FIG. 16. By setting the molds UM and LM in this way, the relative positions between the molds remain very accurate.

Figure 17:
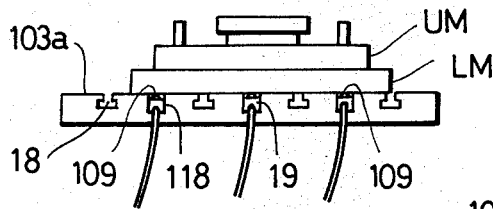
FIGS. 17 to 19 are similar views to FIGS. 13 to 16, but showing a mold setting method of the second embodiment.
Figure 18:
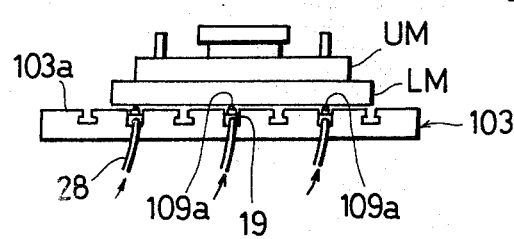
Figure 20:
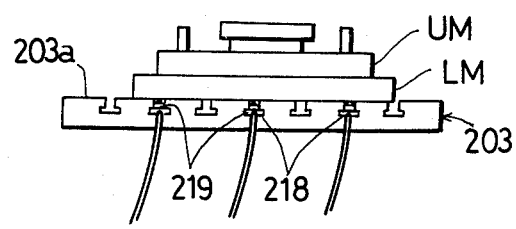
FIGS. 20 to 22 are similar views to FIGS. 17 to 19, but showing a mold setting method of the third embodiment.
Figure 21:
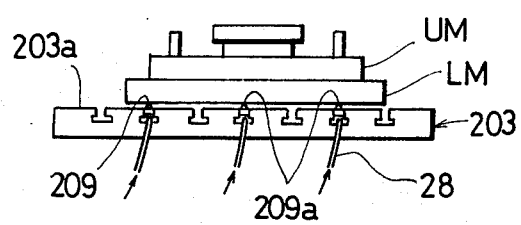
Figure 22:
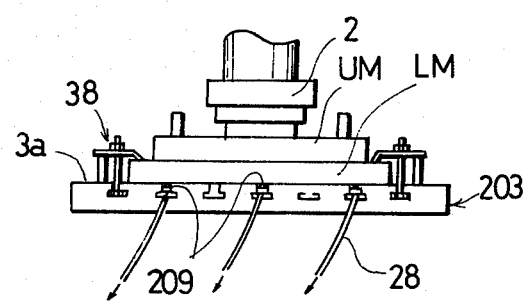

FIGS. 17 to 19 and FIGS. 20 to 22 respectively illustrate how to carry out the methods of the invention by using the mold supporting arrangements as the second and the third embodiments, in which a combined set of the upper mold UM and the lower mold LM is placed upon the bolster surface 103a (203a), as shown in FIG. 17 (FIG. 20). Then, the pressure fluid is fed into each block 19 (219) via the conduits 28 until the top part 109a (209a) of each main ball 109 (209) protrudes slightly above the level of the upper surface 103a (203a) of the bolster, resulting in that the molds UM and LM are freely slidable on the main balls 109 (209) for the desired positional adjustment thereof, as shown in FIG. 18 (FIG. 21). Then, after lowering the press ram 2 onto the upper mold UM and affixing the same to the ram 2 accurately, the lower mold LM is lowered on the spot by discharging the pressure fluid until the top part 109a (209a) of each of the main balls 109 (209) are retracted below the level of the bolster surface 103a (203a). Finally, the lower mold LM should be affixed on the spot to the bolster by clamping the same by means of the known clamps 38. In this way, the lower mold LM can be set to the bolster 103 quite accurately in position.

As a matter of course, it is possible to place the combined molds UM and LM on the bolster after the top parts 109a (209a) of the main balls 109 (209) have been protruded in advance. It is also possible to afix the upper mold UM to the ram 2 after the mold LM have been clamped in a correct position accurately.

The present invention being thus described, it will be obvious that same may be varied in many ways. Such variations are not to be regarded as a departure from the spirit and scope of the present invention, and all such modifications as would be obvious to one skilled in the art are intended to be included within the scope of the following claims.

I claim:

1. A mold supporting arrangement for a press comprising:

a press bolster having a plurality of spaced seating holes formed in an upper surface thereof;

a plurality of bearing units seated in a selected number of said plurality of spaced seating holes, each of said bearing units including a casing having a bottom wall and side wall, a seat body having a hemispherical concave seat formed in a top wall thereof, a layer of small steel balls disposed on said concave seat, a main large ball seated on said layer of small steel balls for free rotation in every direction, and a cover plate detachable to said casing and having an opening window through which a top part of said main ball retractably protrudes, said seat body having a plurality of vertically extending cylindrical chambers formed in a bottom wall thereof; and a selected number of compression coil springs cooperating with one another to give an adjusted spring force for urging said seat body upward, each coil spring having one end seated in one of said cylindrical chambers in said seat body and the other end of each of said coil springs seated on said casing bottom said seat body being elastically slidable up and down in said casing within a predetermined range by means of said selected number of compression coil springs.

* * * * *